United States Patent
Ambrosi et al.

(10) Patent No.: US 9,470,227 B2
(45) Date of Patent: Oct. 18, 2016

(54) INTERNAL GEAR PUMP INCLUDING A SEPARATING PIECE

(71) Applicant: Robert Bosch GmbH, Stuttgart (DE)

(72) Inventors: Massimiliano Ambrosi, Benningen (DE); Michael Eisenlauer, Affalterbach (DE); Rene Schepp, Waiblingen (DE); Edgar Kurz, Heilbronn-Horkheim (DE); Norbert Alaze, Markgroeningen (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 14/785,517
(22) PCT Filed: Mar. 19, 2014
(86) PCT No.: PCT/EP2014/055534
§ 371 (c)(1),
(2) Date: Oct. 19, 2015
(87) PCT Pub. No.: WO2014/170083
PCT Pub. Date: Oct. 23, 2014

(65) Prior Publication Data
US 2016/0069345 A1 Mar. 10, 2016

(30) Foreign Application Priority Data
Apr. 19, 2013 (DE) .................. 10 2013 207 103

(51) Int. Cl.
- F03C 2/00 (2006.01)
- F03C 4/00 (2006.01)
- F04C 2/00 (2006.01)
- F04C 2/10 (2006.01)

(Continued)

(52) U.S. Cl.
CPC ............... *F04C 2/10* (2013.01); *F04C 2/084* (2013.01); *F04C 2/086* (2013.01); *F04C 2/101* (2013.01);

(Continued)

(58) Field of Classification Search
CPC .......... F04C 2/10; F04C 2/101; F04C 2/102; F04C 2/084; F04C 2/086; F04C 15/0026; F04C 15/0019

USPC .................. 418/71, 126–129, 170
See application file for complete search history.

(56) References Cited

U.S. PATENT DOCUMENTS

| | | | | |
|---|---|---|---|---|
| 4,132,514 A | * | 1/1979 | Eckerle | F04C 2/101 418/170 |
| 6,183,229 B1 | * | 2/2001 | Friedmann | F04C 2/101 418/170 |
| 6,450,792 B1 | * | 9/2002 | Eisenbacher | F04C 2/101 418/170 |

FOREIGN PATENT DOCUMENTS

| | | |
|---|---|---|
| DE | 196 13 833 A1 | 10/1997 |
| DE | 10 2009 047 643 A1 | 6/2011 |

(Continued)

OTHER PUBLICATIONS

International Search Report corresponding to PCT Application No. PCT/EP2014/055534, mailed Jun. 17, 2014 (German and English language document) (5 pages).

*Primary Examiner* — Theresa Trieu
(74) *Attorney, Agent, or Firm* — Maginot, Moore & Beck LLP

(57) ABSTRACT

An internal gear pump for a slip-controlled hydraulic vehicle braking system has a pinion, an internal gear and a separating piece which is arranged between the pinion and the internal gear. The internal gear pump also has an inner part and an outer part, and separates a suction chamber from a pressure chamber. The separating piece is configured to protrude counter to a rotational direction of the internal gear pump beyond a sealing point of the inner part on the outer part such that the inner part and the outer part bear in front of the sealing point against at least one tooth tip of a tooth of the pinion and of the internal gear of the internal gear pump. As a result, tilting of the inner part and of the outer part away from the pinion and from the internal gear about the sealing point is avoided.

8 Claims, 1 Drawing Sheet

(51) Int. Cl.
 *F04C 2/08* (2006.01)
 *F04C 15/00* (2006.01)
 *B60T 8/40* (2006.01)

(52) U.S. Cl.
 CPC ........... *F04C 2/102* (2013.01); *F04C 15/0019* (2013.01); *F04C 15/0026* (2013.01); *B60T 8/4031* (2013.01)

(56) References Cited

FOREIGN PATENT DOCUMENTS

| DE | 10 2010 062 219 A1 | 5/2012 |
| WO | 2012/103923 A1 | 8/2012 |

\* cited by examiner

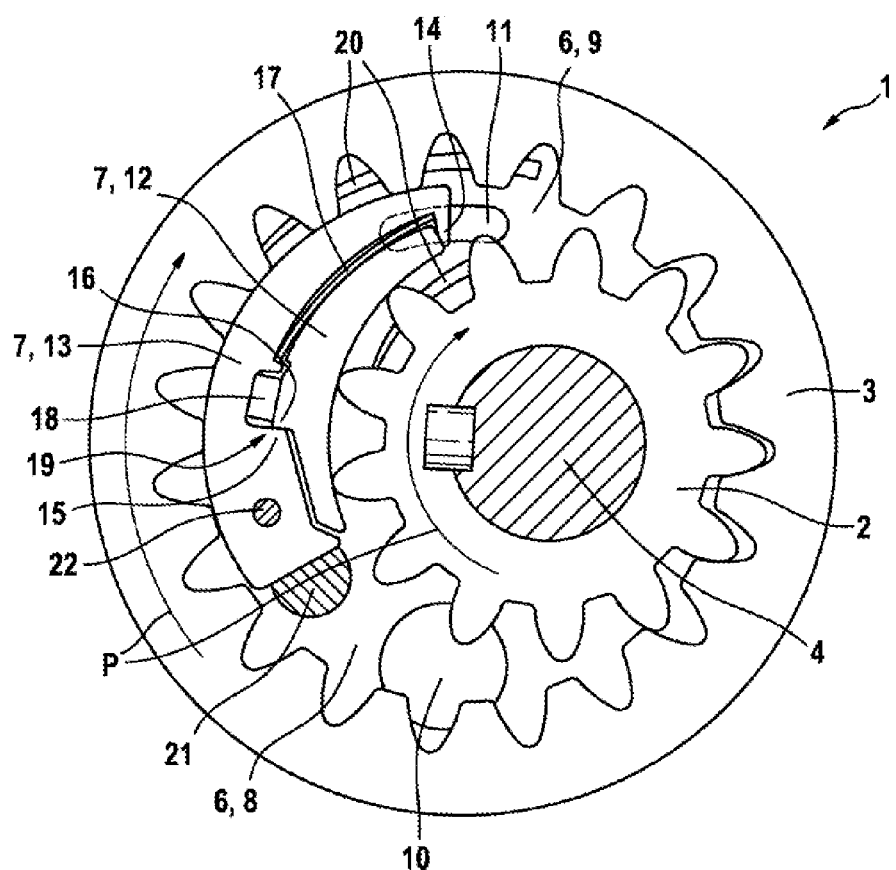

INTERNAL GEAR PUMP INCLUDING A SEPARATING PIECE

This application is a 35 U.S.C. §371 National Stage Application of PCT/EP2014/055534, filed on Mar. 19, 2014, which claims the benefit of priority to Serial No. DE 10 2013 207 103.5, filed on Apr. 19, 2013 in Germany, the disclosures of which are incorporated herein by reference in their entirety.

The disclosure relates to an internal gear pump having the features described herein. Internal gear pumps of this kind are used instead of conventionally employed piston pumps in slip-controlled and/or power-operated vehicle braking systems and are often referred to, though not entirely appropriately, as return pumps.

BACKGROUND

Internal gear pumps are known. They have a pinion, i.e. an externally toothed gearwheel, which is arranged eccentrically in an internally toothed ring gear and meshes with the ring gear at one point on the circumference or in a segment of the circumference. The pinion and the ring gear can also be considered as gearwheels of the internal gear pump. Through rotary driving of one of the two gearwheels, generally the pinion, the other gearwheel, that is to say generally the ring gear, is also driven in rotation, and the internal gear pump delivers fluid in a manner known per se, delivering brake fluid in a hydraulic vehicle braking system.

Opposite the segment of the circumference in which the pinion meshes with the ring gear, the internal gear pump has a crescent-shaped free space between the pinion and the ring gear, which is here referred to as the pump space. Arranged in the pump space is a separating piece, which divides the pump space into a suction space and a pressure space. Owing to its typical shape, the separating piece is also referred to as a crescent or crescent piece, while another name is filler piece. An inner side of the separating piece, said inner side typically being of a hollow round shape, rests on tooth tips of teeth of the pinion, and an outer side of the separating piece, said outer side typically being curved outward, rests on tooth tips of teeth of the ring gear, with the result that the separating piece encloses fluid volumes in tooth interspaces between the teeth of the gearwheels of the internal gear pump. When driven in rotation, the gearwheels deliver the fluid in the tooth interspaces from the suction side to the pressure side.

German Laid-Open Application DE 10 2009 047 643 A1 discloses an internal gear pump of this kind, the separating piece of which is of multipart construction and has an inner part, the inner side of which rests on the tooth tips of the teeth of the pinion, and an outer part, the outer side of which rests on the tooth tips of teeth of the ring gear.

SUMMARY

The internal gear pump according to the disclosure having the features described herein has a multipart separating piece having an inner part, which rests on tooth tips of teeth of a pinion, and an outer part, which rests on tooth tips of teeth of a ring gear. The inner part and the outer part of the separating piece can move relative to one another in a radial direction Like the term "circumferential direction" used below, "radial" refers to the internal gear pump and to an installation position envisaged for the parts. The term "direction of rotation" is intended to mean an envisaged direction of rotation of the pinion and of the ring gear. The mobility of the inner part and the outer part in a radial direction of the internal gear pump allows the envisaged contact between the inner part and the outer part and the tooth tips of the teeth of the gearwheels of the internal gear pump. On its outer side, the inner part is subjected to pressure, with the result that it is pushed inward against the tooth tips of the teeth of the pinion, and the outer part is subjected to pressure on the inner side thereof, with the result that it is pushed outward against the tooth tips of the teeth of the ring gear. The pressurization takes place, in particular, in an interspace between the inner part and the outer part, said interspace preferably communicating with the pressure space of the internal gear pump. To seal off the pressure space from the suction space, the inner part and the outer part of the separating piece are sealed off with respect to one another at a sealing location. The sealing location is the location at which a seal is arranged and/or at which the inner part and the outer part rest directly upon one another for the purpose of sealing. In the case of a plurality of sealing locations, the forwardmost sealing location counter to the direction of rotation of the internal gear pump is intended, i.e. the nearest sealing location to the suction space. According to the disclosure, the inner part and the outer part protrude in the circumferential direction of the internal gear pump to such an extent beyond the sealing location, counter to the direction of rotation of the internal gear pump, that the inner part and the outer part always rest on at least one tooth tip of a tooth of the pinion or of the ring gear ahead of the sealing location between the inner part and the outer part, "always" meaning in any rotational position of the gearwheels. If one tooth of the pinion or of the ring gear is at the level of the sealing location, when viewed in the circumferential direction, the inner part and the outer part rest on at least one tooth tip of another tooth of the pinion or of the ring gear ahead of the sealing location in the direction of rotation. This contact of the inner part and the outer part of the separating piece ahead of the sealing location between the inner part and the outer part in the direction of rotation of the gearwheels provides support for the inner part and the outer part to prevent them from pivoting apart ahead of the sealing location in the direction of rotation, that is to say the inner part pivoting inward and the outer part pivoting outward, and from pivoting toward one another after the sealing location in the direction of rotation, i.e. away from the tooth tips of the teeth of the gearwheels. The disclosure avoids a situation where the inner part and the outer part pivot in such a way that their ends situated after the sealing location in the direction of rotation, i.e. their ends adjacent to the pressure space, move toward one another and, as a consequence, lift off from the tooth tips of the gearwheels.

The following description includes advantageous embodiments and developments of the disclosure as the subject matter thereof.

The subject matter of one embodiment of the disclosure is a pilot feature, by means of which tooth interspaces between the teeth of the pinion and/or of the ring gear communicate with the pressure space. The purpose of the pilot feature is a circumferentially continuous pressure buildup in the tooth interspaces as far as the pressure space in order to avoid an abrupt pressure rise when the tooth interspaces open toward the pressure space during the rotation of the gearwheels. The pilot feature is typically achieved by means of notches of narrow cross section which are situated at a level between the tooth tips and a tooth root of the teeth of the gearwheels, when viewed radially, and extend by a greater or lesser distance from the pressure space along the separating piece. These notches are situated in side walls or axial disks on side faces of the gearwheels and are open toward the teeth of the gearwheels. Via the notches, the tooth interspaces communicate with the pressure space in the region of the separating piece, while the cross section of the notches is so small that a restricting effect arises, which allows the pressure in the tooth interspaces to rise continuously and not abruptly in the circumferential direction. The notches can also have constrictions as restrictors. A different pilot feature than with the notches mentioned is not excluded by the disclosure. According to the disclosure, the pilot feature ends at or after the sealing location of the inner part with the outer part of the separating piece in the direction of rotation of the gearwheels, with the result that a pressure is built up in the tooth interspaces only at or after the sealing location in the circumferential direction. This embodiment of the disclosure prevents the pressure prevailing in the tooth interspaces from pushing the inner part of the separating piece outward and/or pushing the outer part inward and lifting them off the tooth tips of the teeth of the gearwheels.

In particular, the internal gear pump according to the disclosure is provided as a hydraulic pump for a hydraulic, slip-controlled and/or power-operated vehicle braking system. In slip-controlled vehicle braking systems, hydraulic pumps are also referred to as return pumps and are nowadays embodied predominantly as piston pumps.

BRIEF DESCRIPTION OF THE DRAWING

The disclosure is explained in greater detail below by means of an embodiment illustrated in the drawing. The single FIGURE shows an internal gear pump according to the disclosure in end view.

DETAILED DESCRIPTION

The internal gear pump 1 according to the disclosure, which is illustrated in the drawing, is depicted without a pump casing. It has an externally toothed gearwheel, here referred to as pinion 2, and an internally toothed gearwheel, here referred to as ring gear 3. The pinion 2 is arranged parallel to the axis and eccentrically in the ring gear 3 in such a way that the pinion 2 meshes with the ring gear 3. The pinion 2 is fixed against relative rotation on a pump shaft 4, by means of which the pinion 2 and, via the pinion 2, the ring gear 3 meshing therewith can be driven in rotation. A direction of rotation is indicated by arrows P.

Opposite to a segment of the circumference in which the pinion 2 meshes with the ring gear 3, the internal gear pump 1 has a crescent-shaped free space, which is here referred to as pump space 6. A crescent- or semicrescent-shaped, multipart separating piece 7 is likewise arranged in the pump space 6, dividing the pump space 6 into a suction space 8 and a pressure space 9. The suction space 8 communicates with a pump inlet 10, which is embodied as a bore and opens from one side into the suction space 8 of the pump space 6 transversely, i.e. parallel to the axis of the internal gear pump 1. The pressure space 9 communicates with a pump outlet 11, which is embodied as an arc-shaped slot in the embodiment and opens from one side into the pressure space 9 of the pump space 6. The arc-shaped pump outlet 11 is partially overlapped by the separating piece 7 and extends into the pressure space of the pump space 6 by a certain distance in the circumferential direction beyond a pressure-side end of the separating piece 7.

The multipart separating piece 7 has an arc-shaped inner part 12 and a likewise arc-shaped and hoop-shaped outer part 13. A concave and cylindrical inner side of the inner part 12 rests on tooth tips of teeth of the pinion 2, and a convex cylindrical outer side of the outer part 13 rests on tooth tips of teeth of the ring gear 3. By virtue of the contact on the tooth tips of the pinion 2 and of the ring gear 3, the inner part 12 and the outer part 13 of the separating piece 7 enclose fluid in tooth interspaces between the teeth of the pinion 2 and of the ring gear 3, whereby fluid is delivered from the suction space 8 to the pressure space 9 when the pinion 2 and the ring gear 3 are driven in rotation. In the case of the envisaged use of the internal gear pump 1 as a hydraulic pump of a hydraulic vehicle braking system, the fluid delivered is brake fluid.

The outer part 13 has on its inner side a recess in which the inner part 12 rests. At one end, at the rear in the direction of rotation P of the gearwheels 2, 3, i.e. an end adjacent to the pressure space 9, the outer part 13 of the separating piece 7 has an inward-directed angle 14, which fits around and behind an end of the inner part 12 which is at the rear in the direction of rotation P. Between a longitudinal center and an end which is at the front in the direction of rotation P, i.e. an end adjacent to the suction space 8, when viewed in the circumferential direction, the outer part 13 has a step 15 in the recess in which the inner part 12 rests, at which step the recess makes a transition from a tangential segment into an outward-extending radial segment and then into a concavely curved segment extending in the circumferential direction, which extends to the rear end of the outer part 13. The inner part 12 rests by means of a mating step 16 on the radially extending surface of the step 15 of the outer part 13. Both the angle 14 and the step of the outer part 13 of the separating piece 7 extend radially with respect to the internal gear pump 1, i.e. an interspace between the angle 14 and the step 15 decreases in size toward the inside. As a result, the inner part 12 is held radially in the recess of the outer part 13 with play, and the inner part 12 cannot be removed radially from the recess of the outer part 13. The angle 14 and the step 15 engage behind the end of the inner part 12 which is at the rear in the direction of rotation P and behind the mating step 16 of the inner part 12. Owing to the play, the inner part and the outer part 13 can move relative to one another in a radial direction of the internal gear pump 1.

Between the inner part 12 and the outer part 13 there is a gap, which communicates via the slot-shaped pump outlet 11 with the pressure space 9 of the internal gear pump 1. The same pressure prevails in the gap between the inner part 12 and the outer part 13 as in the pressure space 9, namely an outlet pressure of the internal gear pump 1. The outlet pressure pushes the inner part 12 inward against the tooth tips of the teeth of the pinion 2 and pushes the outer part 13 outward against the tooth tips of the teeth of the ring gear 3.

Arranged in the gap between the inner part 12 and the outer part 13 is a leaf spring 17, which pushes the inner part 12 and the outer part 13 apart and thereby pushes the inner part 12 inward against the tooth tips of the teeth of the pinion and the outer part 13 outward against the tooth tips of the teeth of the ring gear 3. The leaf spring 17 ensures that the inner part 12 and the outer part 13 rest on the tooth tips of the teeth of the pinion 2 and of the ring gear 3, especially when the internal gear pump 1 is unpressurized, e.g. stationary.

A flexible sealing element 18 rests between circumferentially extending surfaces of the inner part 12 and the outer part 13 at the step 15 of the outer part 13. The sealing element 18 forms a seal between the inner part 12 and the outer part 13 of the separating piece 7, ensuring that the pressure space 9 is sealed off from the suction space 8. Moreover, the mutually contacting step 15 of the outer part 13 and mating step 16 of the inner part 12 form a seal relative to one another through their direct contact. This sealing through direct contact can also be considered to be a metallic seal, provided that the inner part 12 and the outer part 13 are composed of metal. The pressure space 9 and the suction space 8 are also sealed off from one another by the direct contact of the step 15 on the mating step 16. The location at which the sealing element 18 is situated or the location at which the mating step 16 of the inner part 12 rests on the step 15 of the outer part 13 can also be considered to be a sealing location 19, at which the pressure space 9 and the suction space 8 are sealed off from one another. The flexible sealing element 18 pushes the inner part 12 and the outer part 13 apart and hence pushes the inner part 12 inward against the tooth tips of the teeth of the pinion 2 and the outer part 13 outward against the tooth tips of the teeth of the ring gear 3. When the sealing element 18 is present, the leaf spring 17 may be dispensed with. Particularly when the internal gear pump 1 is unpressurized, the sealing element 18 brings about the sealing between the inner part 12 and the outer part 13. When the internal gear pump 1 is in operation, the outlet pressure of the internal gear pump 1 prevailing in the pressure space 9 presses the inner part 12 and hence the mating step 16 of the inner part 12 into sealing contact with the step 15 of the outer part 13 counter to the direction of rotation P of the gearwheels 2, 3. Even if friction between the tooth tips of the teeth of the rotating pinion 2 and the inner part 12 lifts the mating step 16 of the inner part 12 off from the step 15 of the outer part 13 during operation of the internal gear pump 1, the sealing element 18 ensures reliable sealing. When viewed in the circumferential direction, the sealing element 18 and the mating step 16 of the inner part 12 resting on the step 15 of the outer part 13 form a seal at virtually the same location, and it is therefore possible to refer to a sealing location 19.

The separating piece 7 with the inner part 12, the outer part 13, the leaf spring 17 and the sealing element 18 form a subassembly, which is inserted after preassembly and as a whole unit into the pump space 6 between the gearwheels 2, 3 of the internal gear pump 1. The leaf spring 17, which pushes the inner part 12 and the outer part 13 apart and, in the process, pushes the end of the inner part 12 which is at the rear in the direction of rotation P against the angle 14 and pushes the mating step 16 of the inner part 12 against the step 15 of the outer part 13, holds together the inner part 12, the outer part 13, the leaf spring 17 itself and the sealing element 18, which form the subassembly as which the separating piece 7 is designed, and counteracts any tendency for the parts to fall apart before the separating piece 7 has been inserted in the pump space 6 of the internal gear pump 1.

Counter to the direction of rotation P, i.e. in the direction of the suction space 8, the inner part 12 and the outer part 13 of the separating piece 7 project beyond the sealing location 19, in each case by more than one tooth spacing between the teeth of the pinion 2 and of the ring gear 3 respectively. Ahead of the sealing location 19 in the direction of rotation P, therefore, the inner part 12 is always supported toward the inside on a tooth tip of a tooth of the pinion 2, and the outer part 13 is always supported toward the outside on a tooth tip of a tooth of the ring gear 3.

This support of the inner part 12 and of the outer part 13 on tooth tips of teeth of the pinion 12 and of the ring gear 3 prevents the inner part 12 from being able to pivot inward ahead of the sealing location 19 and prevents the outer part 13 from being able to pivot outward ahead of the sealing location 19. This prevents the inner part 12 from pivoting outward and the outer part 13 from pivoting inward after the sealing location 19 in the direction of rotation P, and thereby prevents them from lifting off from the tooth tips of the teeth of the pinion 2 and of the ring gear 3. By virtue of their projecting beyond the sealing location 19 counter to the direction of rotation P, the inner part 12 and the outer part 13 are held in contact with the tooth tips of the teeth of the pinion 2 and of the ring gear after the sealing location 19 in the direction of rotation.

The internal gear pump 1 has pilot notches 20, via which tooth interspaces between the teeth of the pinion 2 and of the ring gear 3 communicate with the pressure space 9. In cross section, the pilot notches 20 are triangular grooves with a small cross-sectional area, which are formed in side walls or axial disks against which the pinion 2, the ring gear 3 and the separating piece 7 rest laterally. Other cross-sectional shapes of the pilot notches 20 are also possible, e.g. rounded, square or rectangular, trapezoidal. When viewed in the radial direction, the pilot notches 20 are situated between the tooth tips and tooth roots of the teeth of the pinion 2 and of the ring gear 3 and extend a certain distance in the circumferential direction from the pressure space 9, counter to the direction of rotation P of the gearwheels 2, 3. The pilot notches 20 taper counter to the direction of rotation P and end after the sealing location 19 in the direction of rotation P. A cross section of the pilot notches 20 is so small that they act as restrictors and restrict a fluid flow from the pressure space 9 into the tooth interspaces. As a result, a pressure in the tooth interspaces rises continuously from the pressure of the suction space 8 to the outlet pressure in the pressure space 9 after the sealing location 19 in the direction of rotation P. Owing to the fact that the pilot notches start only after the sealing location 19 in the direction of rotation P, pressurization of the inner part 12 from the inside and of the outer part 13 from the outside ahead of the sealing location 19 in the direction of rotation P and hence pressing together of the inner part 12 and of the outer part 13 and lifting off from the tooth tips of the teeth of the pinion 2 and of the ring gear 3 at the front ends adjacent to the suction space 8 are avoided. In general terms, the pilot notches 20 can also be considered as a pilot feature the internal gear pump 1.

Counter to the outlet pressure in the pressure space 9 in the circumferential direction, the outer part 13 of the separating piece 7 is supported on a stud, which is arranged at the front end of the outer part 13 and passes through the pump space 6 transversely there. The stud, which has a flat for contact of the front end of the outer part 13, is here referred to as abutment 21. A pin 22, which passes transversely through a hole in the front end of the outer part 13, holds the outer part 13 against accompanying the movement of the rotating ring gear 3 in the circumferential direction. The inner part 12 is supported counter to the direction of rotation P by means of its mating step 16 on the step 15 of the outer part 13 against the pressurization in the pressure space 9. In the direction of rotation P, the inner part 12 is secured by the angle 14 of the outer part 13.

The internal gear pump 1 according to the disclosure is provided as a hydraulic pump of a hydraulic, slip-controlled and/or power-operated vehicle braking system (not shown), where it is used for slip control operations, such as antilock brake operations, traction control operations and/or vehicle dynamics control operations, and/or in hydraulic power-operated vehicle braking systems for the purpose of producing brake pressure. Such hydraulic pumps are also referred to, though not entirely appropriately, as return pumps. The abbreviations ABS, ASR, FDR and ESP are common for the slip control operations mentioned. Vehicle dynamics control operations are also referred to informally as antiskid control operations.

The invention claimed is:

1. An internal gear pump for a hydraulic vehicle braking system, comprising:
   an internally toothed ring gear;
   an externally toothed pinion arranged eccentrically in the ring gear, the pinion configured to mesh with the ring gear in a segment of a circumference of the ring gear; and
   a separating piece arranged in a crescent-shaped pump space formed between the pinion and the ring gear opposite the segment of the circumference, the separating piece configured to divide the pump space into a suction space and a pressure space, the separating piece having an inner part and an outer part configured to move relative to one another in a radial direction, wherein:
   the inner part rests on tooth tips of teeth of the pinion, is subjected to pressure on an outer side, and is pushed inwardly against the tooth tips of the teeth of the pinion,
   the outer part rests on tooth tips of teeth of the ring gear, is subjected to pressure on an inner side, and is pushed outwardly against the tooth tips of the teeth of the ring gear,
   the inner part and the outer part are sealed off with respect to one another at a sealing location in order to seal off the pressure space from the suction space, and
   the inner part and the outer part are configured to protrude in a circumferential direction to an extent beyond the sealing location, counter to a direction of rotation of the internal gear pump, such that the inner part and the outer part always rest on at least one tooth tip of a tooth of the pinion or of the ring gear ahead of the sealing location.

2. The internal gear pump as claimed in claim 1, wherein an interspace between the inner part and the outer part communicates with the pressure space.

3. The internal gear pump as claimed in claim 1, further comprising:
   a pilot feature, by which at least one of tooth interspaces between the teeth of the pinion and tooth interspaces between the teeth of the ring gear communicate with the pressure space,
   wherein the pilot feature does not begin ahead of the sealing location in the circumferential direction in the direction of rotation of the internal gear pump.

4. The internal gear pump as claimed in claim 1, wherein:
   one of the inner part and the outer part is held in the circumferential direction in at least one of the direction of rotation and counter to the direction of rotation of the internal gear pump, and
   the outer part is held on the inner part or the inner part is held on the outer part in the circumferential direction in or counter to the direction of rotation of the internal gear pump.

5. The internal gear pump as claimed in claim 1, wherein the inner part and the outer part rest directly upon one another at the sealing location in order to seal off the pressure space from the suction space.

6. The internal gear pump as claimed in claim 5, wherein the separating piece includes a sealing element, and the sealing element is arranged at that location in the circumferential direction of the internal gear pump at which the inner part and the outer part rest directly upon one another.

7. The internal gear pump as claimed in claim 1, wherein the inner part and the outer part engage with play one behind the other in a radial direction.

8. The internal gear pump as claimed in claim 1, wherein components of the separating piece form a preassemblable subassembly.

* * * * *